United States Patent [19]

Lundgren

[11] 4,173,907
[45] Nov. 13, 1979

[54] DEVICE FOR TRANSFORMING A ROTATIONAL MOTION INTO A LINEAR MOTION

[75] Inventor: Bengt Lundgren, Ulricehamn, Sweden

[73] Assignee: SKF Nova AB, Goteborg, Sweden

[21] Appl. No.: 824,406

[22] Filed: Aug. 15, 1977

[30] Foreign Application Priority Data

Nov. 19, 1976 [SE] Sweden ................................ 7612934

[51] Int. Cl.² ............................................. F16H 25/22
[52] U.S. Cl. .......................................... 74/459; 74/25; 74/424.8 R
[58] Field of Search ............. 74/25, 459, 424.5, 424.7, 74/424.8; 64/31

[56] References Cited

U.S. PATENT DOCUMENTS

| 3,327,551 | 6/1967 | Prueter | 74/459 |
| 3,534,626 | 10/1970 | Elliott | 74/459 |
| 4,074,587 | 2/1978 | Brusasco | 74/459 |

FOREIGN PATENT DOCUMENTS

| 2153023 | 5/1973 | Fed. Rep. of Germany | 74/25 |
| 1264194 | 5/1961 | France | 74/459 |

*Primary Examiner*—Samuel Scott
*Assistant Examiner*—G. A. Anderson
*Attorney, Agent, or Firm*—Eugene E. Renz, Jr.

[57] ABSTRACT

A device for transforming a rotational motion into a linear motion comprising a shaft and a sleeve enclosing the shaft, the shaft and sleeve adapted for relative axial movement upon relative rotation of the shaft and sleeve. A plurality of rolling bodies between the shaft and the sleeve arranged in a closed track with a load carrying part in the form of a spiral line and a relieved recirculation part. The sleeve includes an inner portion of flexibly deformable material suited for contracting the rolling bodies and have a helical race track therefor and an outer portion provided with a recirculation channel for the rolling bodies. The shaft which is enclosed by the sleeve has a smooth surface and the rolling bodies are urged against the shaft by means of the inner elastic portion of the sleeve.

4 Claims, 3 Drawing Figures

DEVICE FOR TRANSFORMING A ROTATIONAL MOTION INTO A LINEAR MOTION

BACKGROUND OF THE INVENTION

The present invention refers to a device for transforming a rotational motion into a linear motion or vice versa of the kind defined in the preamble of the attached claim 1.

Earlier known devices of this type include a shaft, which is provided with a helical groove corresponding to the helical race track of the inner part of the sleeve, whereby the load-carrying rolling bodies move in these grooves. An example of such a device is shown in German OS No. 2.241.206. The play in the race tracks of the rolling bodies is in this device adjustable in that a helical spring, which is used as a race track in the sleeve can be compressed axially and radially, whereby zero-play can be achieved. The helical race track in the shaft has a certain pitch and the pitch of the helical spring cannot be allowed to differ appreciably therefrom. The pitch of the helical spring is furthermore altered when the spring is compressed and due to these facts the possibilities of adjustment are limited.

The primary purpose of the present invention is to provide a device of the type referred to hereabove, which has zero-play and which is not depending of a helical groove in the shaft and which need not have a sleeve manufactured with high accuracy without therefore causing the operation properties of the device to be appreciably impaired.

This is achieved thereby that the device in accordance with the invention is given the properties defined in the attached claims.

A device according to the invention is noiseless and easy to adapt for different purposes of use and as a shaft without helical grooves can be used it is possible to manufacture at a low cost a device, which is reliable in operation.

BRIEF DESCRIPTION OF THE DRAWINGS

The invention will hereinbelow be further described with reference to the accompanying drawing, in which FIG. 1 shows a longitudinal section and FIG. 2 is a cross section along line II—II in FIG. 1 of a device according to an embodiment of the invention, whereas

BRIEF DESCRIPTION OF THE PREFERRED EMBODIMENT

Figure 1:
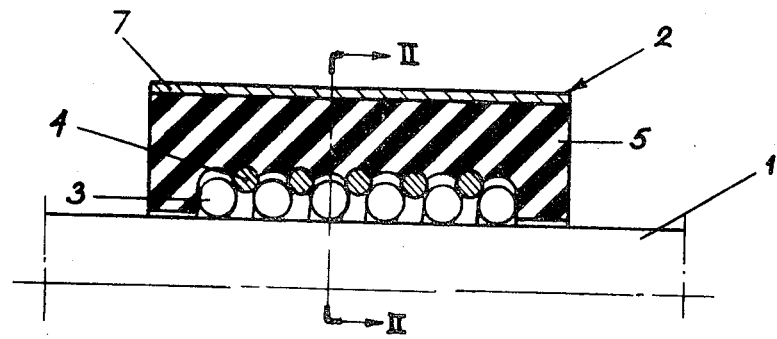
Figure 2:
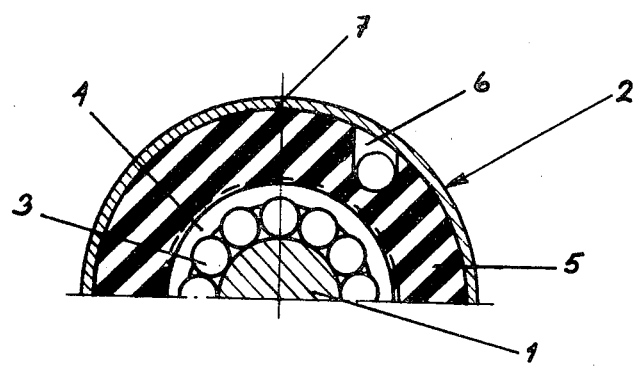

In FIGS. 1 and 2 is shown a shaft 1 with a smooth surface. A sleeve 2 encloses the shaft and is rotatably and displaceably arranged relative to the shaft. A number of rolling bodies in form of balls 3 are arranged between the shaft and the sleeve. The balls are arranged in a closed circuit with a load-carrying part in the form of a spiral line and a load-relieved recirculation part. The sleeve has an internal portion of elastic, compressible material suited for contact with the balls. In the embodiment according to FIGS. 1 and 2 this portion consists of a helical spring 4 of steel. The adjacent turns of the wound spring defines a helical race track for the load-carrying balls, which therefore each will engage points on two adjacent turns of the spring and on the surface of the shaft 1.

The helical spring is enclosed by an outer sleeve portion 5, which preferably comprises an elastic polymeric material, such as rubber or a thermoplastic elastomer. The outer sleeve portion is provided with a recirculation channel 6 for the rolling bodies. The ends of this channel is in a matter known per se connected to the ends of the load-carrying ball track part in order to provide a closed race track for the balls. The recirculation channel can preferably consist of a longitudinal groove in the envelope surface of the outer sleeve portion 5. In order to improve the resistance of the sleeve 2 against external influence, e.g. of mechanical or chemical type the sleeve is preferably enclosed in an outer sleeve 7 of a material, which is resistant against external influence, e.g. steel. The sleeve also serves as the roof of the groove 6 when this is arranged in the envelope surface of the sleeve portion 5. The sleeve can also if necessary be provided with end covers of appropriate material. The outer sleeve and possibly also the end covers will improve the external rigidity of the sleeve which is advantageous for the possibilities of using the device.

The dimensions of the sleeve, the balls and the shaft are such that the balls when they are relieved from load engage the helical race track in the inner portion of the sleeve will contact the envelope surface of an imagined inscribed cylinder, which has a diameter somewhat less than the diameter of the shaft 1. This means that the balls, when the sleeve with balls are arranged on the shaft, will be pressed against the smooth shaft by means of the inner elastic portion of the sleeve, the race track of which therefore being deformed, preferably thereby that the distance between the turns of the wound spring will increase when the balls are urged radially outwards at the assembly of the sleeve on the shaft. Due to the balls rubbing against the shaft the sleeve will be prevented from being displaced along the shaft without at the same time rotating relative thereto. The ball race track on the shaft is not fixed, as the shaft has a smooth surface, and this means that the device will function satisfactorily independent of the pitch of the helical race track in the sleeve. Even if the inner portion of the sleeve is deformed in such a manner that the pitch of the helical spring is changed appreciably the device will therefore retain its function. The tightening of the sleeve and the diameter of the shaft 1 can therefore be varied within wide ranges, which will increase the usability of the device. By using an elastic polymeric material for the outer portion of the sleeve the elasticity of the entire sleeve and the shock-absorbing ability is improved at the same time as the sound level during operation is reduced.

Figure 3:
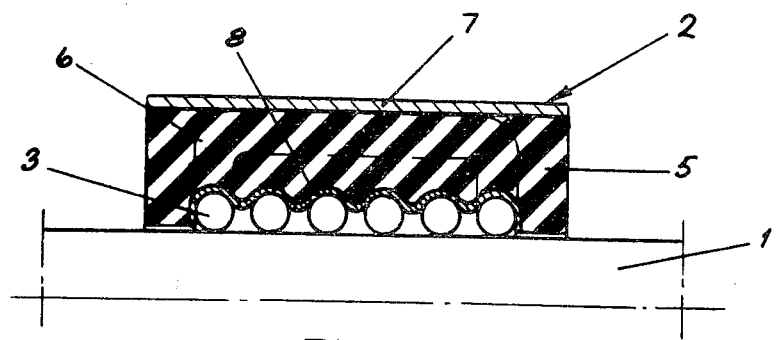
FIG. 3 shows a longitudinal section of a device according to another embodiment of the invention.

The embodiment shown in FIG. 3 includes as in FIGS. 1a and 2 a shaft 1, a sleeve 2, rolling bodies in the form of balls 3 and an outer sleeve portion 5 with a recirculation channel 6, shown in dashed lines and an enclosing outer sleeve 7. The sleeve 2 has in this embodiment, instead of an inner sleeve portion in the form of a helical spring as shown in FIGS. 1 and 2, an inner portion in the form of a helically corrugated tube 8. The helical race track is here composed by the concave portions of the tube as seen from the inside thereof. The recirculation channel 6 is at its ends in a manner known per se connected to apertures in the tube in order to form a closed race track for the balls.

A comparatively thin walled steel tube with a helical corrugation has a certain axial and radial elasticity and the tightening of the balls between the shaft and the helical race track in the sleeve can therefore take place in a manner corresponding to that described in connection to the embodiment of FIGS. 1 and 2, i.e. the shaft has a certain oversize in relation to the dimensions of the balls and the sleeve, which will bring about elastic deformation and preloading of the sleeve during assembly.

I claim:

1. A device for transforming a rotational motion into a linear motion, or reversed, and comprising a shaft having a smooth peripheral surface (1), a sleeve (2) circumscribing said shaft and being rotatably and linearly displaceably arranged thereon, and a plurality of rolling elements (3) disposed between the shaft and the sleeve and arranged in a closed track with a load carrying portion in the shape of a helical line and an unloaded recirculation portion, the sleeve comprising an inner portion (4, 8) of resiliently deformable material with a comparatively hard surface having a helically shaped raceway for the rolling bodies, and an outer portion (5) provided with a recirculation channel (6) for the rolling bodies, said rolling bodies being urged against the smooth peripheral surface of said shaft by the inner resilient portion of the sleeve, the outer portion (5) of said sleeve being made of a resiliently deformable polymer material which contacts the inner portion of the sleeve along the entire length of the load carrying portion of the closed track.

2. A device according to claim 1, characterized thereby, that the inner portion of the sleeve includes a helical spring against which the load carrying rolling bodies engage.

3. A device according to claim 1, characterized thereby, that the inner portion of the sleeve includes a helically corrugated tube against which the load carrying balls engage.

4. A device according to claim 1, characterized thereby, that the recirculation channel is arranged in the envelope surface of the elastic polymeric material and that the sleeve is enclosed in an outer sleeve which is resistant against external influence.

* * * * *